Oct. 7, 1969    F. O. SNOW III    3,470,999
ROTARY ELEVATOR
Filed Sept. 26, 1967
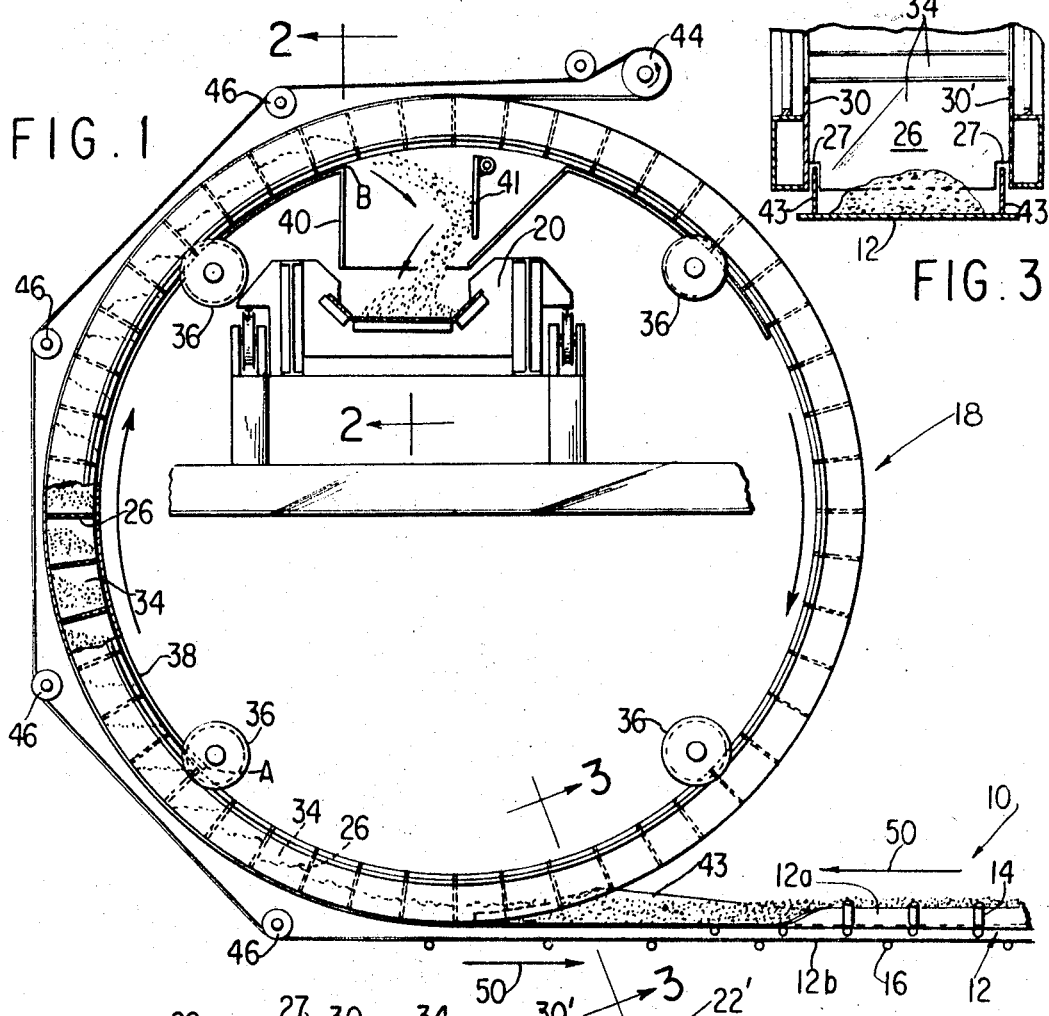
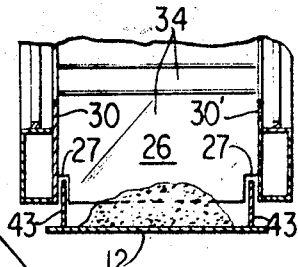
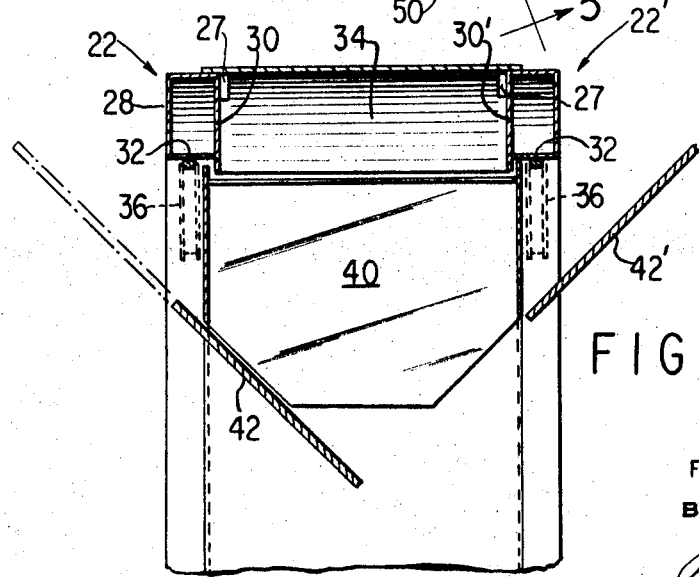
INVENTOR
FREDERICK O. SNOW, III
BY *John D. Boos*
ATTORNEY

United States Patent Office 3,470,999
Patented Oct. 7, 1969

3,470,999
ROTARY ELEVATOR
Frederick O. Snow III, Wayne, N.J., assignor to Hewitt-Robins Incorporated, Stamford, Conn., a corporation of Delaware
Filed Sept. 26, 1967, Ser. No. 670,581
Int. Cl. B65g 29/00
U.S. Cl. 198—103   10 Claims

ABSTRACT OF THE DISCLOSURE

The present invention employs a rotatably mounted wheel in combination with a belt conveyor for elevating material conveyed by the conveyor. The wheel has a plurality of storage cells formed around the periphery of the wheel. The conveyor belt wraps around a peripheral section of the wheel trapping the material on the belt in the storage cells and thereby permitting the conveyed material to be elevated to a discharge location.

BACKGROUND OF THE INVENTION

Conventional endless belt conveyors can generally convey bulk materials up maximum inclines in the order of 15° to 20°. If the angle of inclination for this type of conveyor is increased above this upper limit, the free flowing character of some bulk materials will cause the material on the inclined portion of the conveyor to slide down toward the bottom of the incline. The shifting bulk material will cause spillage problems and decrease the conveying capacity of the conveyor.

Another problem with conventional belt conveyors is that a relatively long horizontal distance is required if the conveyor is to elevate the conveyed material through a relatively large vertical distance. One reason for this is, as previously stated, because the conveyor can only be inclined at a maximum angle of 15 or 20 degrees. A second reason is because the transition from the horizontal portion of a conveyor to the inclined portion must be very gradual in order to prevent the conveyor belt from lifting off the idlers. Thus, this transition portion of the conveyor must be designed so as to allow the conveyor belt to move through an upward vertical curve having a very large radius if the conveyor belt is to be properly supported in this location.

It will therefore be apparent that a conventional belt conveyor would be unsuitable in those situations where, because of space limitations, the conveyed material must be elevated a relatively large distance vertically within a relatively short horizontal distance.

One prior art solution to these problems suggested the use of a second belt arranged to travel in face-to-face relationship with the inclined section of the conveyor belt so that the conveyed material is held between the two belts as the material is elevated or conveyed up the incline. This type of system necessitates two independent belt systems with a mechanical or electrical system to synchronize the speed of the entire system. In addition, the belts for this type of system are generally not conventional and must be specially designed and constructed.

Other prior art solutions have employed additional pieces of material handling equipment such as bucket elevators to lift the conveyed material. This type of solution is not completely satisfactory since bucket elevators travel relatively slowly so that extremely large buckets are required if it is to convey the same capacity as the conveyor. In addition, a bucket elevator is a separate piece of equipment having an independent drive and control systems which must also be synchronized with the conveyor.

SUMMARY OF THE INVENTION

The present invention overcomes many of the disadvantages of the prior art by having a conventional conveyor belt come in contact with and wrap around a section of a rotatably mounted wheel. The wheel is formed with a plurality of peripheral storage cells that form storage compartments for the conveyed material on the belt. The conveyed material is trapped in the compartments between the belt on the outside and a backplate on the inside and is carried upward to an overhead discharge location.

Accordingly, one object of the present invention is to provide elevating means for use in combination with a belt conveyor for elevating conveyed material.

Another object is to provide an elevating wheel in combination with a belt conveyor whereby conveyed material on the belt conveyor can be elevated a relatively large height within a relatively short distance.

A further object of the invention is to provide an elevating wheel which is frictionally driven by, and which cooperates with, a belt conveyor for elevating conveyed material on the conveyor belt.

DESCRIPTIONS OF THE DRAWINGS

Other objects, advantages and novel features of the present invention will become apparent from the following detailed description of the invention when considered in conjunction with the drawings wherein:

FIG. 1 is a side view of the head end of a belt conveyor employing the elevating wheel of the present invention with parts broken away;

FIG. 2 is a view taken along line 2—2 of FIG. 1;

FIG. 3 is a view taken along line 3—3 of FIG. 1.

DETAILED DESCRIPTION OF THE INVENTION

Referring now to the drawings, a conventional conveyor 10 is shown with the conveyor belt 12 having a conveying reach 12a supported by troughing idler roll assemblies 14 and a return reach 12b supported by straight return idlers 16. At the head end of the conveyor an elevating wheel 18 cooperates with the conveyor belt, as will hereinafter be described, to raise the conveyed material to a second conveyor 20.

The elevating wheel 18 is formed with spaced, substantially parallel annular rim structures 22, 22' coupled together by equally spaced, radial partition members 26. Each rim structure is composed of an annular support member 28 having a channel shaped cross section, a flat annular side plate 30 coupled to the support member and guide rail 32 coupled to the inside of the annular support member. The guide rails 32 of each of the rim structures are in planes which are substantially parallel to each other and combine to form a substantially circular closed loop track system. Each partition member is formed with spaced slots or cutout means 27 which cooperate with the spaced side boards of the conveyor, as will hereinafter be described. The side plates 30, 30' of rim structures 22, 22' combine with partitions 26 to form a plurality of substantially rectangular storage cells 34 located around the periphery of the elevating wheel. The storage cells have exterior loading openings which open radially outwardly around the periphery of the elevating wheel and interior unloading openings which open radially inwardly toward the center of the elevating wheel.

The elevating wheel is rotatably supported by a plurality of rotatably mounted support wheels 36 that fit on the guide rails 32, as seen in FIG. 2. In the embodiment disclosed, four wheels are employed with each of the guide rails and are positioned as shown in FIG. 1. Each wheel is rotatably supported from conventional support structure, not shown, and is provided with suitable bearing means to insure easy rotation.

An arcuate backing plate 38 covers the interior opening of the cells 34 between points A and B as indicated in FIG. 1. The backing plate is substantially channel-shaped in cross section and the sides of the channel extend upwardly around the inside edge of the side plates 30, 30' as seen in FIG. 2. In this manner material in the storage cells between points A and B is prevented from being discharged through the inside openings of the storage cells. At point B the backing plate terminates in order to permit material in the cells to be discharged into chute 40 formed over the second conveyor 20. A pivotally suspended baffle 41 and extensible baffles 42, 42' may be mounted in the chute for directing the conveyed material onto conveyor 20.

As shown in FIG. 1 the troughed horizontal section of the conveying reach is first flattened out as the belt approaches the elevating wheel. A side board 43 is mounted parallel to, and on each side of, the conveying reach in this location where the belt is first flattened. The side boards are in contact with the top surface of the conveying reach and extend vertically upward in order to combine with the flattened belt to form a horizontal trough which prevents the conveyed material from spilling over the sides of the belt. The side boards extend into the storage cells of the wheel, as shown in FIGS. 1 and 2, at the location where the slots 27 are formed in the partition members. It will therefore be apparent that the side boards serve as a guide means for guiding material on the conveying reach into the loading openings and that the slots 27 permit the partition members to sweep past the section of the side boards which extend into the storage cell area when the elevating wheel is in operation.

After the horizontal section of the conveying reach has been flattened, the elevating section of the conveying reach then wraps around a peripheral section of the elevating wheel. In the embodiment disclosed, the elevating section is shown wrapped around approximately one-half the circumference of the wheel, however it is only necessary that the elevating section remain in contact with the wheel until all the conveyed material has been transferred from the conveying reach into the storage cells, as will hereinafter be described. The loading openings of the wheel are closed by the elevating section of the belt as shown in FIG. 2. Sufficient frictional contact is made between the belt and the elevating wheel so that the belt will drive the periphery of the elevating wheel at substantially the same speed and in the same direction as the conveying reach. After the belt has extended around the elevating wheel, it is reeved about head drive pulley 44 and is guided back down to the straight conveyor section by rolls 46. The belt then travels over the straight idler rolls 16 to the tail pulley, not shown.

In operation, the conveyor belt is driven by powered head pulley 44 in the direction indicated by arrows 50 and the conveyor belt, in turn, frictionally drives the elevating wheel in a clockwise direction, as viewed in FIG. 1. The conveying reach of the conveyor belt is gradually flattened from its troughed position as it approaches the rotating elevating wheel and the flat elevating section then wraps around a peripheral section of the wheel. The material on the conveying reach is guided by the side boards into the storage cells of the rotating elevating wheel at a loading station at the bottom of the wheel and the material trapped in the storage cells is then elevated to a discharge or unloading station located over conveyor 20.

It will be recognized that the elevating section of the conveying reach and the backing plate combine with the storage cells in order to prevent material in the cells from being discharged through the openings as the cells move from the loading station to the unloading station. The elevating section of the conveying reach serves as a cover which prevents material from being discharged through the loading openings. It is therefore necessary that the elevating section remain in contact with the wheel at least until the material in the storage cells has been transferred from the belt or, in other words, until the conveyed material has shifted away from the loading openings, as shown in FIG. 1. The backing plate 42 covers the interior openings of the storage cells as the cells are elevated between points A and B and prevents the shifting material from otherwise being discharged through the unloading openings. Thus, the backing plate covers the unloading openings of the storage cells as the cells move through that portion of the path between the loading station and the discharge station where the trapped material would normally be discharged through the unloading openings.

The above described elevating means can be employed at almost any location where material on belt conveyors must be elevated a relatively large height within a relatively short distance. For example, this invention can be employed with a discharge conveyor located at the bottom of a self-unloading vessel. In this case the conveying reach extends beneath the storage holds and a means is employed for loading material from the storage holds onto the conveying reach. In one particular type of self-unloading vessel, the head end of the discharge conveyor and the elevating wheel is located at the stern of the vessel and the elevating wheel elevates the material to a shuttle conveyor in an arrangement similar to that shown in the drawings.

It will be apparent that the elevating wheel of the present invention provides means for use in combination with a conventional belt conveyor which will permit conveyed material to be elevated relatively large heights within relatively short distances. By trapping the conveyed material in the storage cells it is possible to overcome the elevating problem caused by the relatively free flowing character of many types of bulk materials. The elevating wheel is specially designed so that side boards can guide conveyed material directly into the loading openings of the storage cells. The friction drive of the elevating wheel by the conveyor belt obviates the problems of synchronizing the speed of the wheel with the speed of the belt. Also, the specific elevating wheel design is relatively simple with the storage cells open at either end and with the wheel not having any center spoke structure.

Obviously many modifications and variations of the present invention are possible in light of the above teachings. For example, the backing plate can be eliminated if the storage cells were shaped and the unloading openings were positioned in such a manner that the storage cells would retain the stored material until the cells reached the discharge station. It is therefore to be understood that the invention may be practiced otherwise than has been specifically described.

What is claimed is:

1. An elevating wheel in combination with a conveyor having a conveying reach, said elevating wheel being formed with storage cells around the periphery of said wheel, each of said cells being formed with a loading opening and an unloading opening, the loading opening for each of said cells opening outwardly around the periphery of said wheel, said elevating wheel being rotatably mounted and having a driving means for rotating said wheel when said conveyor is in operation, an elevating section of said conveying reach wrapped around a peripheral section of said wheel so that material on the elevating section can be transferred into said storage cells whereby the material in said storage cells is then elevated to a discharge location where material in said storage cells is discharged through said unloading openings.

2. The combination described in claim 1 wherein said drive means is a friction drive resulting when the conveyor is in operation with the elevating section of said conveying reach wrapped around, and in contact with, a peripheral section of said wheel.

3. The combination described in claim 1 which is further characterized by guide means on said conveyor for guiding material on said conveying reach into said loading openings in said wheel.

4. The combination described in claim 1 wherein said elevating wheel comprises two substantially parallel and spaced apart annular rims coupled together by equally spaced radial partition members so as to form a plurality of storage cells around the periphery of the wheel, a circular closed loop track system formed around the inside of the said annular rims, said elevating wheel being supported by rotatably mounted wheels which fit on said closed loop track system and which permits said elevating wheel to be rotated.

5. An elevating mechanism in combination with a conveyor, said conveyor having a conveyor belt with a conveying reach and a return reach, said elevating mechanism comprising an elevating wheel and a closure means associated with said wheel, said elevating wheel having a plurality of storage cells formed around the periphery of said wheel, each of said storage cells being formed with a loading opening and an unloading opening, said loading opening being formed to open outwardly from the periphery of said wheel, said elevating wheel being rotatably mounted and having a drive means for driving the periphery of said wheel at substantially the same speed as said conveyor belt, an elevating section of said conveying reach being wrapped around a peripheral section of said wheel so that material on the elevating section can be transferred into said storage cells and elevated in said cells to a discharge station when said conveyor is in operation, said closure means preventing material trapped in said storage cells from being discharged through said unloading openings as said storage cells move from the loading station to the discharge station.

6. The combination described in claim 5 wherein said drive means is a friction drive resulting when the conveyor is in operation with the section of said conveying reach wrapped around a peripheral section of said wheel.

7. The combination described in claim 5 wherein said closure means comprises a backing plate shaped and positioned so as to cover the unloading openings of said storage cells as said storage cells move through that portion of the path from the loading station to the discharge station where material trapped in said storage cells would normally be discharged through said unloading openings.

8. The combination described in claim 5 wherein said elevating wheel comprises two substantially parallel and spaced apart annular rims coupled together by equally spaced radial partition members so as to form a plurality of storage cells around the periphery of the wheel, a circular closed loop track system formed around the inside of the said annular rims, said elevating wheel being supported by rotatably mounted wheels which fit on said closed loop track system and which permits said elevating wheel to be rotated.

9. The combination described in claim 8 which is further characterized by said boards on each side of said conveying reach extending into said storage cells for guiding material on said conveying reach into said unloading opening in said wheel, said partition members being formed with cutout means which permits said partition members to sweep past the section of said side boards extending into said storage cells.

10. The combination described in claim 8 wherein said closure means comprises an arcuate backing plate is positioned so as to cover the unloading openings of said storage cells as said storage cells move through that portion of the path from the loading station to the discharge station where material trapped in said storage cells would normally be discharged through said unloading openings.

References Cited
UNITED STATES PATENTS

| | | | |
|---|---|---|---|
| 2,792,926 | 5/1957 | Borrowdale | 198—167 |
| 2,795,317 | 6/1957 | Borrowdale | 198—167 |

EDWARD A. SROKA, Primary Examiner

U.S. Cl. X.R.

198—167